P. A. GEARY.
CLUTCH.
APPLICATION FILED MAY 1, 1908.

913,279.

Patented Feb. 23, 1909.

WITNESSES:

INVENTOR
Peter A. Geary
BY
Criswell & Criswell
ATTORNEYS

UNITED STATES PATENT OFFICE.

PETER A. GEARY, OF NEW YORK, N. Y.

CLUTCH.

No. 913,279.  Specification of Letters Patent.  Patented Feb. 23, 1909.

Application filed May 1, 1908. Serial No. 430,379.

*To all whom it may concern:*

Be it known that I, PETER A. GEARY, a citizen of the United States, and a resident of New York, county and State of New York, have invented certain new and useful Improvements in Clutches, of which the following is a full, clear, and exact description.

This invention relates more particularly to a clutch adapted to automatically lock and hold the end to a clothes line.

The primary object of the invention is to provide a simple and efficient device in which one end of a rope may be permanently attached thereto, and the free end thereof passed through and threaded in the device in such a way that the said rope may be quickly released when desired, and which when the rope is in a certain position will automatically clutch and lock the rope so that it will not slip or become loosened, thus overcoming the necessity for making a knot or otherwise tying the end of the rope, which often becomes difficult particularly when supporting a number of objects.

A further object of the invention is to provide a simple device which may be readily made, and which is so formed that the rope may be quickly threaded through the same to be held, or the device quickly removed from the rope.

The invention will be hereinafter more particularly described with reference to the accompanying drawings, which form a part of this specification, and will then be pointed out in the claims at the end of the description.

Figure 1:
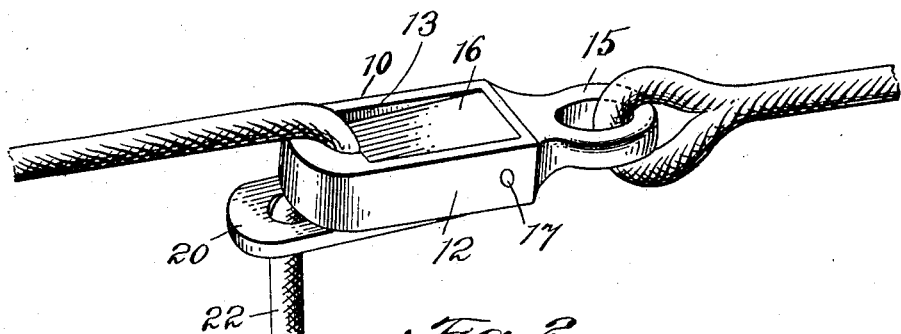
Figure 2:
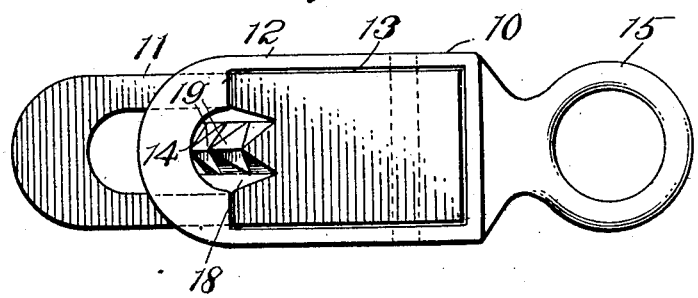
Figure 3:
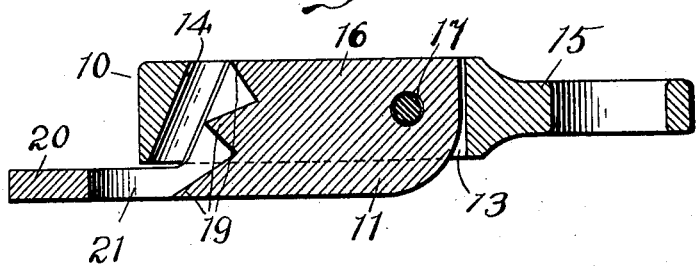

In the drawings, Figure 1 is a perspective view of one form of device embodying my invention. Fig. 2 is a detail plan view; and Fig. 3 is a longitudinal section through the device.

The device may be constructed of any suitable material and may be of any desirable form. As shown it comprises a member 10 and a pivotally held member 11. The member 10 has a substantially rectangular body 12 in which is a substantially rectangular opening 13, the forward end of which is beveled or inclined and provided with a recess as at 14, and projecting outward from one end of the member 10 is an eye 15 or other securing means to which one end of a rope or other connection may be fastened. The member 11 has a body portion 16 which is substantially rectangular and corresponds to the shape of the opening 13, and said member 11 is pivotally held within said opening by means of a pin or bolt 17 or in any other desired way. This member 11 is cut away, as at 18, at one end or edge of its body portion and is provided with a plurality of teeth or engaging points 19, the engaging edges of latter being arranged on a line corresponding to the inclination of the part 14 of the member 10, so that an opening is provided between the teeth 19, and the inclined part 14 for threading the free end of the rope. An extension 20 is provided on the member 11, and through said extension and in alinement and forming a continuation of the edge of the teeth 19 is an opening 21 through which the free end of the rope or connection to be held is passed.

As will be seen when the free end of the rope, as 22, Fig. 1, is passed through the opening between the teeth 19 and the inclined part 14 of the member 12, and the member 11 released, the tension of the rope or the act of the same in attempting to pull loose, will force the member 11 upwardly so as to cause the teeth 19 to engage and rigidly hold the rope, but when the member 11 is pressed downward from the upper surface thereby or by means of the extension 20, the said member 11 will be moved on its pivot 17, and will be released from the rope so that the same will be disconnected, or more slack or length of the loop in the rope provided.

The term "rope" is intended to include any connection to which the device may be applied.

From the foregoing it will be seen that a simple and efficient clutch or device is provided in which one end of a rope may be permanently fastened to one of the members, and the free end thereof held in such a way that it will be automatically gripped and held when the free end of the rope is threaded therein, and which is so made that the free end of the rope may be quickly and readily released from the device.

Having thus described my invention, I claim as new and desire to secure by Letters Patent:—

1. A device of the character described comprising a supporting member provided with an eye at one end, and an inclined groove at the opposite end, and an engaging member pivotally mounted in said supporting member and provided with teeth, the engaging surfaces of which are in a plane approximately parallel with said groove.

2. A device of the character described, comprising a supporting member provided with an eye at one end, and an inclined groove at the opposite end, and an engaging member pivotally mounted in said supporting member provided with teeth, the engaging surfaces of which are in a plane approximately parallel with said groove, said engaging member being also provided with an extension having an opening in line with said teeth.

3. A device of the character described, comprising a supporting member and an engaging member pivotally mounted therein, the free end of said engaging member being provided with teeth arranged on an incline from the outer to the inner faces of said engaging member.

This specification signed and witnessed this twenty-ninth day of April A. D. 1908.

PETER A. GEARY.

Witnesses:
M. TURNER,
E. KRANCER.